Sept. 6, 1960 P. E. ANDERSON ET AL 2,951,253
MACHINE FOR CLEANING WIRE SPRING RELAYS
Filed July 1, 1957 5 Sheets-Sheet 4
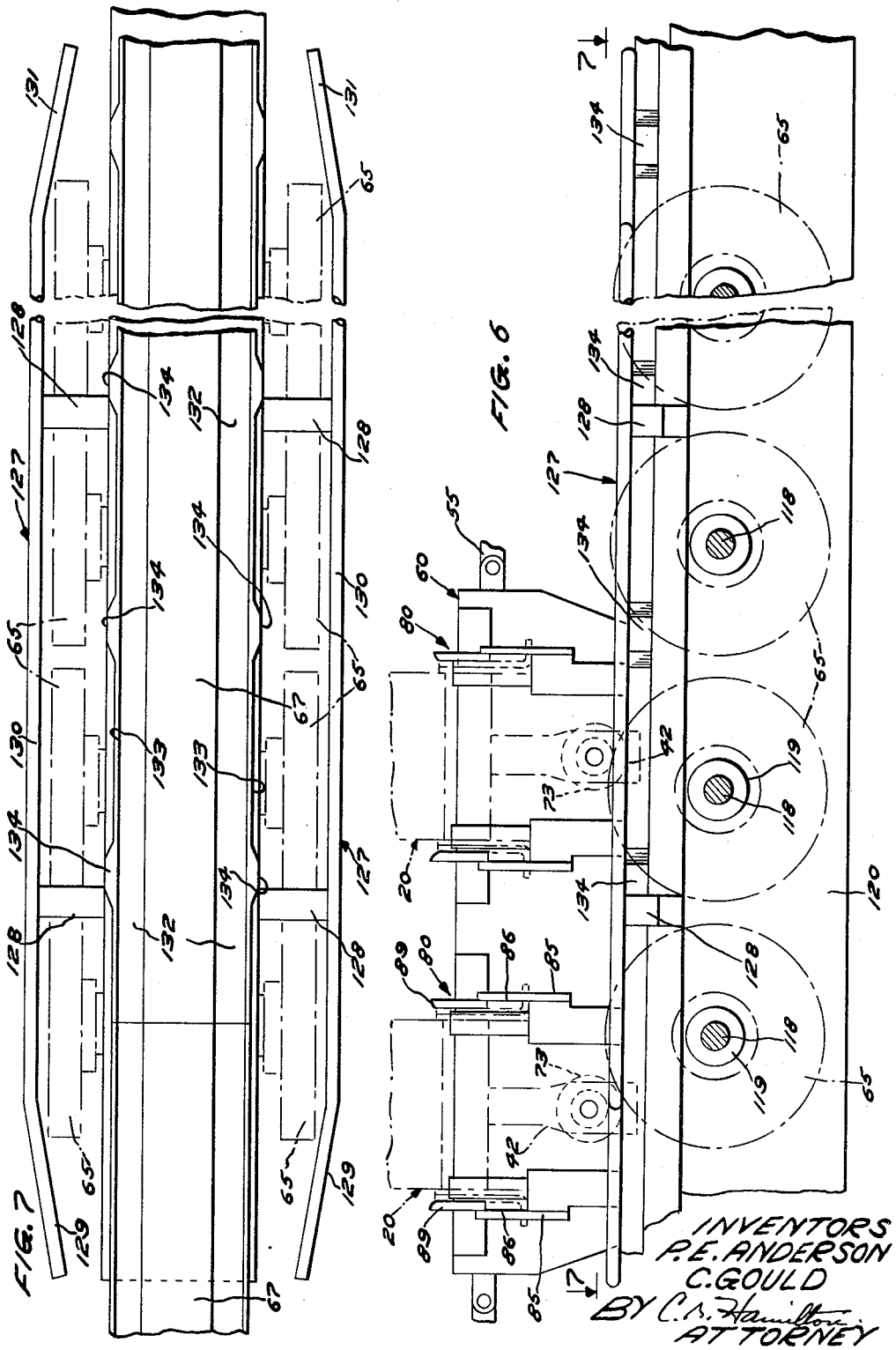
INVENTORS
P.E. ANDERSON
C. GOULD
BY C. A. Hamilton
ATTORNEY

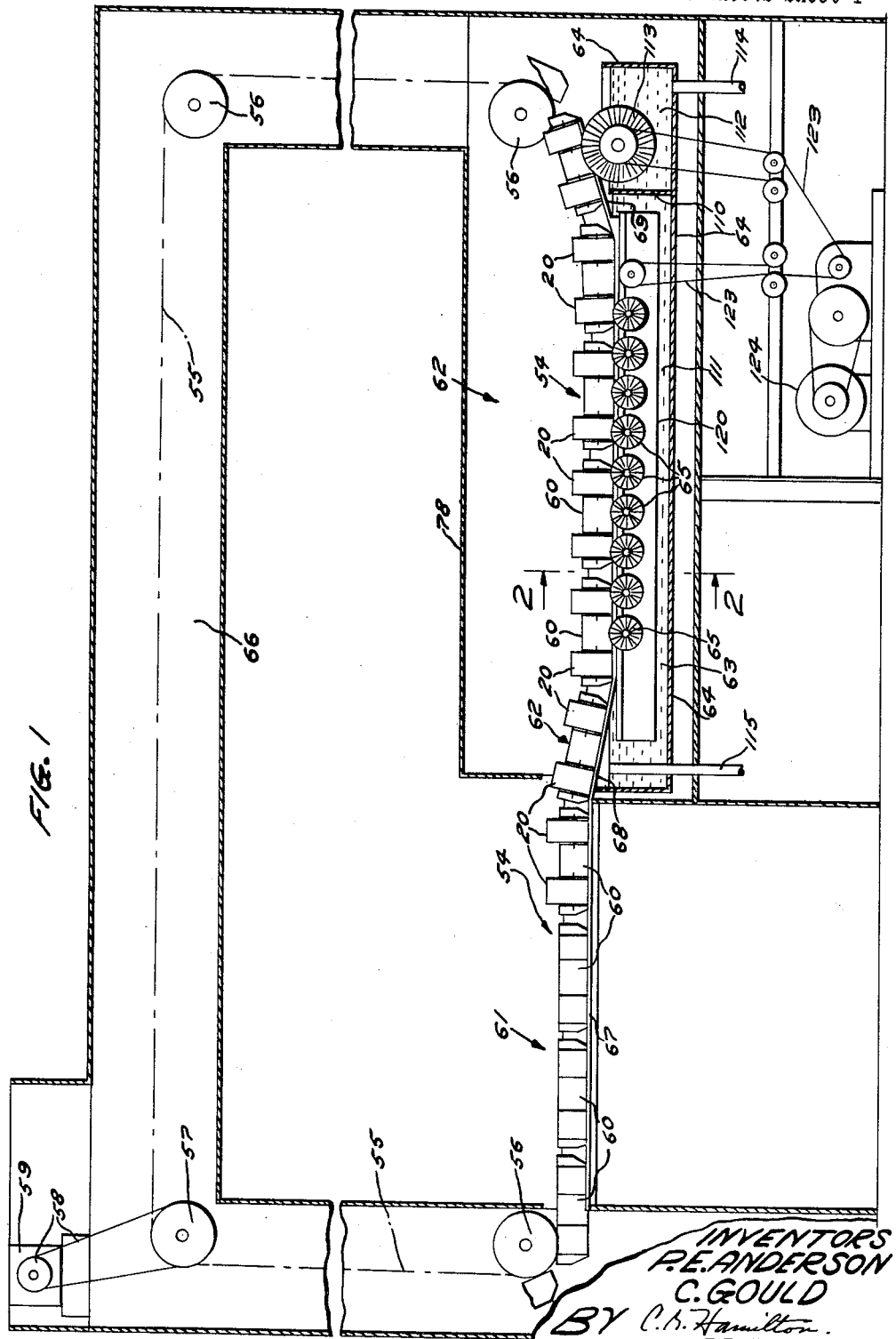

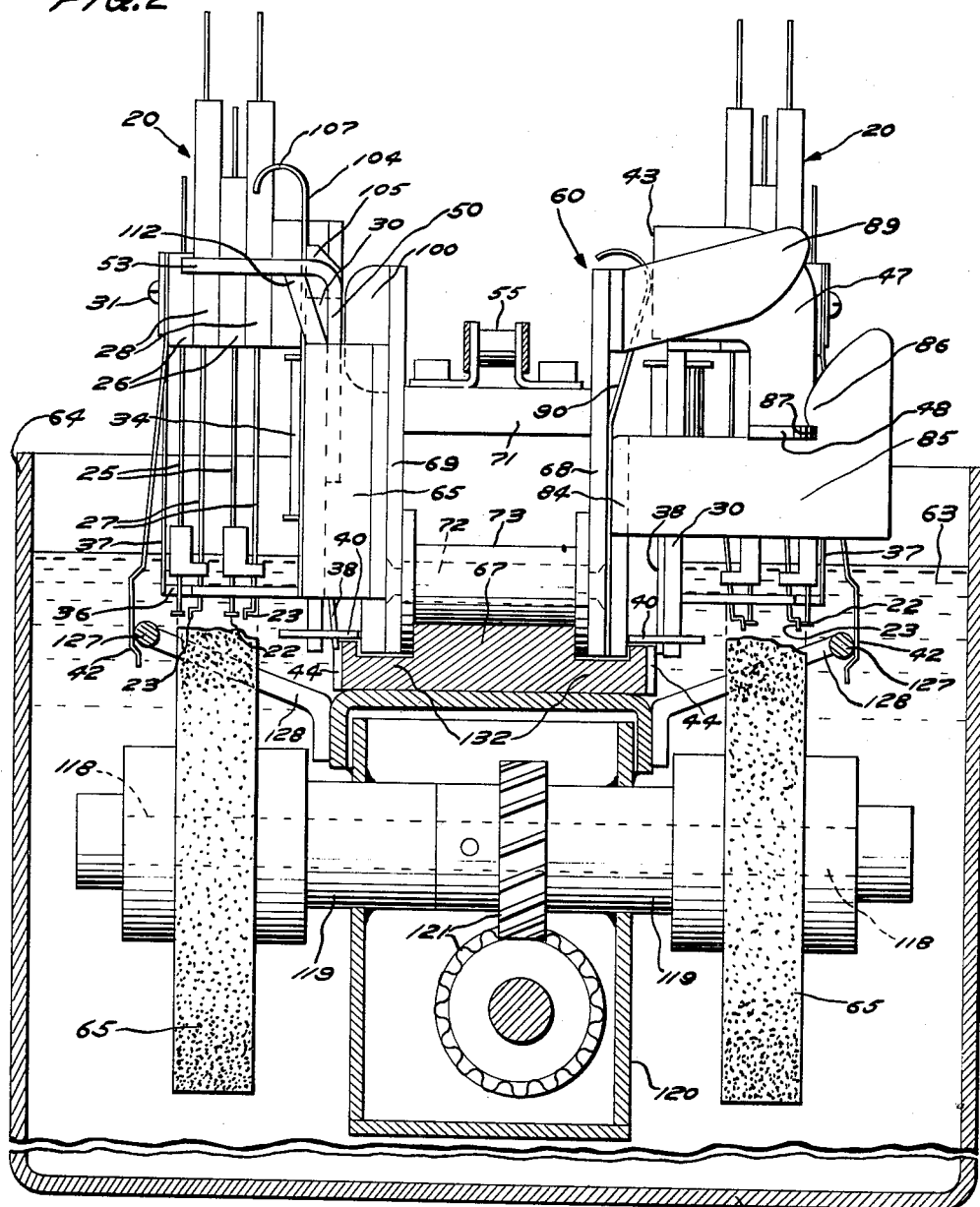
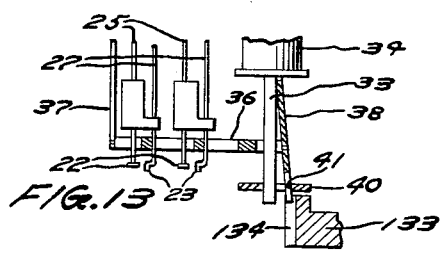

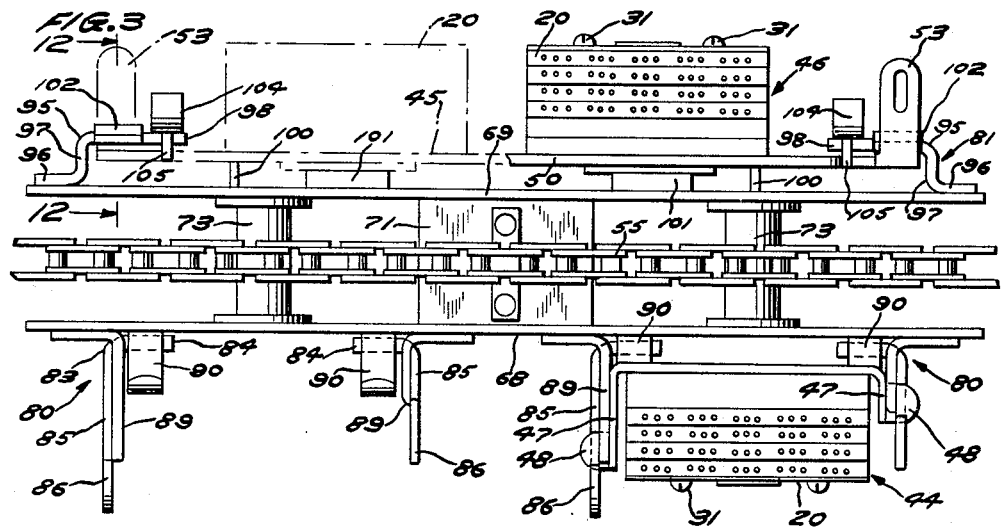

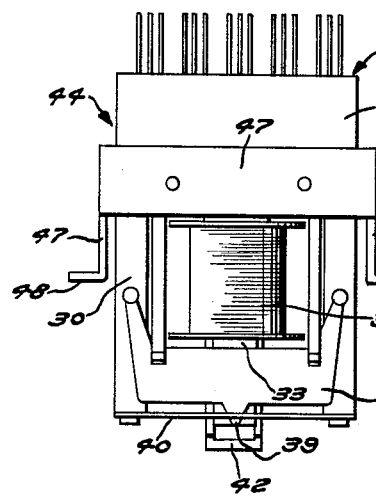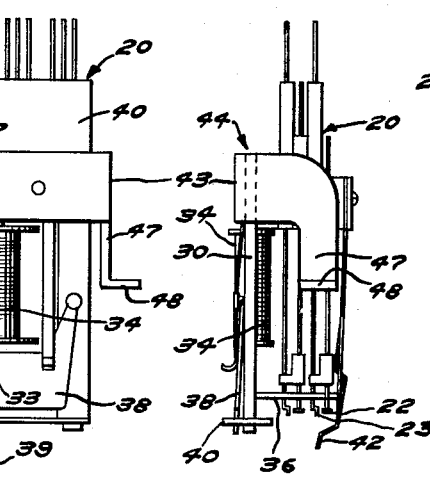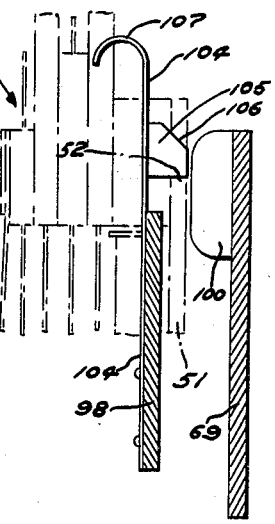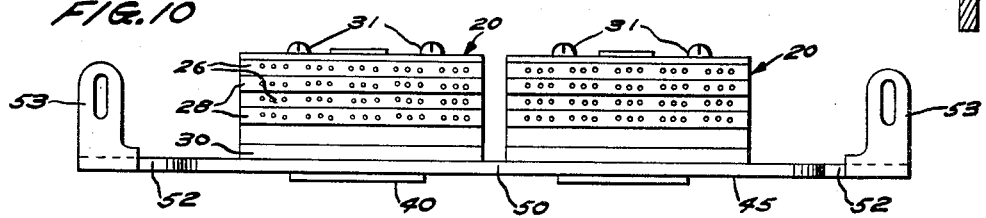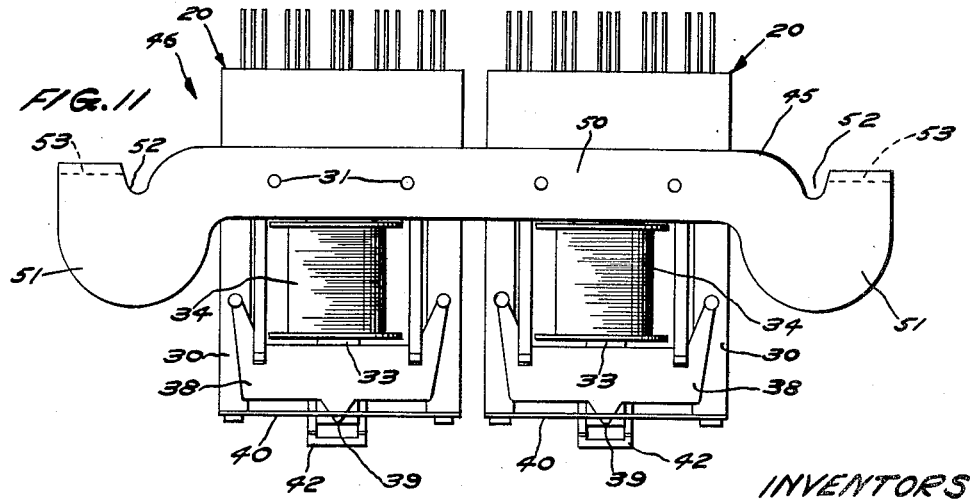

United States Patent Office 2,951,253
Patented Sept. 6, 1960

2,951,253

MACHINE FOR CLEANING WIRE SPRING RELAYS

Paul E. Anderson, Hinsdale, and Clifford Gould, Cicero, Ill., assignors to Western Electric Company, Incorporated, New York, N.Y., a corporation of New York Filed July 1, 1957, Ser. No. 669,065

2 Claims. (Cl. 15—21)

This invention relates to a cleaning machine for conveying wire spring relays through a bath of cleaning liquid and cleaning portions thereof and is an improvement over the apparatus for cleaning relays disclosed in copending application Serial Number 581,113, filed April 27, 1956.

An object of the invention is to provide a relay cleaning machine having an endless conveyor movable through a closed path in a vertical plane and having carriers on the conveyor which are capable of supporting different types of relay units therein for movement therewith and to which the relay units may be readily applied and from which they may be readily removed.

Another object of the invention is to provide a relay cleaning machine for conveying relays through a bath of cleaning liquid and having cam means for actuating the relay armatures while in the bath to separate the armatures from their stops and cause the cleaning liquid to flow therebetween.

Another object of the invention is to provide a relay cleaning machine for conveying wire spring relays through a predetermined path to cause the contacts thereon to be advanced in a cleaning bath and into engagement with rotary brushes therein and to provide means for deflecting and holding spring latching members on the relays out of the path of the brushes.

A machine illustrating certain features of the invention may include an open tank of cleaning liquid and an endless conveyor movable through a closed path in a vertical plane and having carriers thereon into which wire spring relays are placed at a loading station and moved through the tank of cleaning liquid to bring the contacts on the relays into engagement with rotary brushes in the tank. Stationary cams mounted in the tank actuate armatures on the relays to move them from abutments on the relays and cause the cleaning liquid to flow over and clean the contacting surfaces of the armature and the abutments, and stationary deflector rods mounted in the tank serve to deflect flat-spring latching members on the relays to hold them out of the path of the rotary brushes while the brushes scrub the contacts.

Other objects and advantages of the invention will be more clearly understood by reference to the following detailed descriptions thereof and the accompanying drawings, in which—

Fig. 1 is a vertical longitudinal sectional view through the relay cleaning machine;

Fig. 2 is an enlarged fragmentary vertical cross-sectional view of the machine taken on line 2—2 of Fig. 1;

Fig. 3 is a fragmentary plan view of a portion of the machine showing a portion of the conveyor with a carrier thereon for supporting different types of relay units on opposite sides thereof;

Fig. 4 is a view of the carrier from one side thereof showing a single relay unit supported therein;

Fig. 5 is a view of the other side of the carrier showing a portion of a double relay unit supported therein;

Fig. 6 is a fragmentary side elevational view of the machine showing a carrier with relays therein, and a deflector bar for deflecting the flat-spring latching members on the relays laterally from the path of the rotary cleaning brushes;

Fig. 7 is a fragmentary plan sectional view of the machine taken on line 7—7 of Fig. 6 showing the conveyor supporting track with cams thereon for actuating the armatures on the relays and showing the deflector bars;

Figs. 8 and 9 are front and end views, respectively, of a single relay unit;

Figs. 10 and 11 are plan and front views, respectively, of a double relay unit;

Fig. 12 is an enlarged fragmentary vertical sectional view through the carrier taken on line 12—12 of Fig. 3 and showing a latching spring for holding a double relay unit on the carrier; and Fig. 13 is a fragmentary vertical sectional view showing one of the cams of the machine for actuating the armatures of relays being cleaned in the machine.

The present apparatus is designed to dip the end portions of wire spring relays 20 (Figs. 8–11) into a tank of cleaning liquid and into engagement with rotating brushes therein to clean the contacts and portions of the armatures and the cooperating stop surfaces therefor. Each of the relays has a plurality of pairs of stationary and movable contacts 22 and 23, respectively, with the pairs of contacts arranged in two rows adjacent to each other. The stationary contacts 22 are mounted on the ends of wire springs 27 (Fig. 2) which are molded in rows in blocks 26 of dielectric material, and the movable contacts 23 are welded to the ends of movable wire springs 27 molded in rows in blocks 28 of dielectric material. The blocks 26 and 28 are secured in assembled relation to each other to a core plate 30 by screws 31. The core plate 30 has a plurality of legs onto the middle one 33 of which is mounted an electromagnetic coil 34. The end portions of the movable wire springs 27 are engageable by an actuating card 36 which is urged in one direction by a pair of flat springs 37 (Figs. 4 and 5) to open the contacts 22 and 23. The cards 36 are moved in the opposite direction to close the contacts by an armature 38 which is pivotally supported on the core plate 30 and has a finger 39 which projects downwardly through an aperture in a plate 40 secured to the core plate and which engages an abutment or stop surface 41 (Fig. 13) of the plate 40 for limiting the movement of the card and the movable contacts to open position. The relays have mounted thereon flat-spring latching members 42 (Figs. 2, 4, 5 and 9) for releasably retaining dust caps (not shown) on the relays for protecting the contacts thereof. When the dust caps are removed the latching members 42 flex to normal positions with the ends thereof disposed below and in alignment with the outer rows of stationary contacts 22 (Fig. 9).

As shown in Figs. 8 and 9 a relay 20 may be secured to a mounting bracket 43 to form a single relay unit 44 and, as shown in Fig. 10, a pair of relays 20 may be secured to a mounting bracket 45 to form a double relay unit 46. The mounting bracket 43 of the single relay unit has an elongated flat body portion 47 secured to the relay by the screws 31 and it has a pair of L-shaped end portions 47 which extend at right angles from the body portion on opposite sides of the relay and have horizontally disposed mounting lugs 49 on the lower ends thereof. In the double relay units 46 the two relays 20 are secured by the screws 31 to an elongated flat body portion 50 of the mounting bracket 45 which has enlarged end portions 51 formed thereon with notches 52 therein and with mounting lugs 53 extending horizontally and transversely therefrom.

The relay cleaning machine comprises an endless conveyor 54 (Fig. 1) including a chain 55 entrained around a plurality of idler sprockets 56 and a driving sprocket 57 which are rotatably supported in a suitable framework of the machine. The conveyor is guided through a predetermined closed path in a vertical plane and the drive sprocket 57 thereof is driven through a chain and sprocket connection 58 from a motor 59. A plurality of carriers 60 mounted on the conveyor for movement therewith are adapted to receive and releasably support the relay units 44 and 46 for movement therewith through a predetermined path including a loading and unloading station 61, a cleaning station 62 where the end portions of the relays are dipped into a pool of cleaning liquid 63 in a tank 64 and are moved horizontally in the cleaning liquid into engagement with a plurality of rotary brushes 65 for cleaning the contacts, and through a drying tunnel 66 where the relays are air dried on their return trip to the unloading station 61. The conveyor 54 is supported for movement through the loading and unloading station 61 and the cleaning station 62 on a track 67 which slopes in the regions adjacent the end portions of the tank to lower and to raise the conveyor and the relays and effect the movement of the ends of the relays 20 into and out of the pool of cleaning liquid 63.

At the loading and the unloading station 61 the conveyor 54 is supported with the carriers accessible for the loading of the uncleaned relays 20 thereon and the unloading of the cleaned relays 20 therefrom. The cleaning station 62 and other portions of the apparatus are provided with suitable housings.

Each of the carriers 60 (Figs. 3–5) comprise a pair of elongated vertically disposed plates 68 and 69 secured in spaced relation to each other to a spacer block 71 and a pair of axles 72 on which flanged rollers 73 are mounted. The spacer blocks 71 of the carriers are secured to a link of the chain 55 to connect the carrier thereto and the rollers 73 ride on the track 67. The plate 68 of the carrier 60 is provided with two holders 80 for releasably supporting two single relay units 44 thereon and the plate 69 is provided with a holder 81 for releasably supporting a double relay unit 46 thereon.

Each of the holders 80 comprises a pair of brackets 83 having flanges 84 secured to the plate 68 and having transversely bent horizontally disposed arms 85 (Fig. 2) for receiving and supporting the mounting lugs 48 of a single relay unit 44. The arms 85 have upwardly directed hooked ends 86 with notches 87 for receiving portions of the mounting lugs 48 therein to hold the relay unit 44 against upward displacement and against lateral movement from the carrier plate 68. Each holder 80 has a pair of arms 89 secured to the carrier plate 68 for receiving the single relay unit 44 therebetween to limit endwise movement thereof on the carrier 60. A pair of flat springs 90 for each holder 80 (Figs. 2, 5 and 12) are secured at their lower ends to the carrier plate 68 between the plate and the flange 84 of the bracket 83, and have upper ends engageable with the mounting plate for stressing the single relay unit 44 to the right as viewed in Fig. 2 to maintain the mounting lugs 48 thereof seated in the recesses 87 of the holder 80. The springs 90 and the hook ends 86 of the brackets 83 serve to hold the single relay units on the carrier in its inverted position during its return movement through the drying tunnel 66.

The single relay unit 44 is loaded onto a carrier 60 by aligning it with the holder 80 and moving it obliquely downwardly between the arms 89 and 85 in a longitudinal direction while guiding the mounting lugs 48 transversely between the hook ends 86 and the arms 89 into the position shown in Fig. 2. To remove the single relay unit 44 from the carrier 60 at the unloading station the relay is gripped by the operator and pushed toward the carrier plate 68 to flex the springs 90 and release the mounting lugs 48 from the hooked ends 86 after which the relay unit 44 is raised obliquely from the holder 80.

The holder 81 on the carrier plate 69 for supporting a double relay unit 46 comprises a pair of Z-shaped brackets 95 which have flanges 96 secured to the plate 69, transversely disposed portions 97, and flanges 98 disposed parallel and in spaced relation to the plates 69. The double relay unit is applied to the holder 81 with the end portions 51 of the mounting plate 50 positioned between the flanges 98 and the carrier plate 69 and in engagement with or in close proximity to the flanges 98. Spacer lugs 100 and 101 on the carrier plate 69 are engageable with the mounting brackets 50 and the relays 20 to prevent displacement of the double relay unit toward the mounting plate. Angularly disposed upper portions 102 of the flanges 98 of the brackets 95 have flat upper surfaces for engaging the mounting lugs 53 and supporting the double relay unit 46 on the carrier. Flat spring latches 104 are secured at their lower ends to the flanges 98 and have latching lugs 105 which engage in the notches 52 in the mounting brackets 45 for releasably holding the double relay unit 46 on the carrier 60 and preventing it from dropping as the carriers and relays are inverted during their return trip through the tunnel 67. The latching lugs 105 on the springs 104 having sloping surfaces 106 which are engaged by the portion 51 of the mounting plate 54 as the double relay unit is loaded into the holder for camming the springs and the latching lugs laterally out of its path. Finger grips 107 are also provided on the upper ends of the latching springs 104 by means of which the springs may be retracted to permit removal of the relay unit from the carrier.

In the loading of the relay unit 46 onto the carrier, the operator grasps the ends of the mounting brackets 45 and the mounting lugs 53 and moves the unit into vertical alignment with the holder 81 on the carrier 60 and then lowers it into the holder until the mounting lugs 53 rest on the supporting portions 102 of the brackets 95. During the downward movement of the relay unit, the mounting bracket 45 thereof will engage and cam the springs 104 and the latching lugs 105 laterally out of its way, and when the relay unit has been seated on the supporting members 102, the latching lugs 105 will have returned to their normal position and engaged the upper portion of the mounting brackets in the notches 52 thereof to releasably secure the relay unit against removal from the carrier. To remove the relay unit 46, the operator engages the finger grips 107 of the springs 104 and flexes the springs to disengage the latching lugs 105 from the relay unit, and with his other fingers and thumbs he engages the mounting lugs 53 and portions of the mounting bracket 45 and removes the relay unit 46 upwardly from the carrier.

The carrier 60 with relay units 44 and 46 mounted in the holders 80 and 81 on opposite sides thereof, support the relays 20 with the lower portions thereof extending downwardly in predetermined positions so that as the conveyor advances the relays in the cleaning station 62, the lower ends of the relays are moved into the pool of cleaning liquid 63 in the tank 64 and into engagement with the rotary brushes 65 (Figs. 1 and 2). The tank 64 has a bottom, side and end walls, and a transverse partition 110 which divides the tank 64 into an elongated compartment 111 in which the rotary brushes 65 are mounted, and a relatively short compartment 112 in which a large rotary brush 113 is mounted. Fresh cleaning liquid is flowed into the compartment 112 through a supply pipe 114 to form a pool of fresh cleaning liquid which is maintained at a predetermined level by the partition 110 and which overflows the partition into the compartment 111 where it forms the pool 63 which is maintained at a lower level by an overflow pipe 115 through which the excess cleaning liquid is removed therefrom.

The brushes 65 are arranged in two horizontal rows and are mounted on opposite ends of shafts 118 (Fig. 2). These shafts are rotatably supported in bearings 119 on a housing 120 mounted in the tank 64 beneath the track 67. The brushes 65 are interconnected through a spiral gear drive 121 which is driven by a mechanism including a chain drive 123 (Fig. 1) and a motor 124 which also drives the large brush 113. Thus, as the relays are advanced by the conveyor 54 the open contacts 22 and 23, immersed in the cleaning liquid, will be engaged by the rotating brushes 65 and cleaned thereby, and as the contacts are lifted out of the cleaning liquid in the compartment 111 they are engaged by the brush 113 which is supplied with fresh cleaning liquid and serves to rinse or remove any foreign matter adhering to the contacts.

As the relays are advanced in the zone of the brushes 65 the dust cap latching members 41 on the relays are cammed laterally out of the path of the brushes 65 by a pair of rods 127 (Figs. 2, 7 and 8) which are supported on arms 128 secured to the upper portion of the housing 120. The rods 127 have angularly disposed portions 129 at one end for camming the latching members outwardly before they reach the brushes 65, intermediate straight portions 130 for maintaining the latching members in their outward position during the movement of the relays past the brushes, and angularly disposed portions 131 for effecting the return of the latching members to their normal positions after they have passed the brushes.

Means are provided for mechanically actuating the armatures 38 while they are immersed in the cleaning liquid to move the armatures from the stop surfaces 41 of the plates 40 and permit the cleaning liquid to dissolve and clean away any foreign matter which may adhere to the co-acting abutting surfaces of the relays 38 and the stop surfaces 41 on the plates 40 and which may interfere with the free movement of the armature in response to energization of the coil 34. For this purpose the portion of the conveyor supporting track 67 in the zone of the brushes 65 is extended laterally below the carriers as shown at 132 in Figs. 2 and 7 and a pair of stationary cam bars 133 are formed thereon in a position to engage the end portions of the fingers 49 of the armatures 38 as the relays 20 are advanced in the zone of the brushes. The cam bars 133 have a plurality of cam lobes 134 thereon which move the armatures from the stop surfaces 41 for predetermined short periods of time at a plurality of regular intervals during which the abutting portions of the stop surfaces 41 and the armatures 38 are cleaned by the cleaning liquid therebetween.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a machine for cleaning contacts of relays having resilient latching members stressed to a normal position with end portions extending beyond and in overlapping relation to some of the contacts, the combination of a tank for holding a cleaning liquid, rotary brushes mounted in the tank and immersed in the cleaning liquid for cleaning the contacts, holders for supporting the relays with the contacts and the end portions of the latching members directed downwardly into the cleaning liquid, a conveyor for moving said holders along a predetermined path to effect the movement of the contacts of the relays into the cleaning liquid and into engagement with said rotary brushes, and a stationary deflecting member mounted in said tank for deflecting the latching members on the relays laterally out of the path of the rotary brushes while the contacts are being cleaned thereby, said deflecting member having an end portion mounted in the path of movement of the end portions of said latching member and disposed obliquely to the path of movement thereof for camming the latching members laterally to a position on one side of the brushes, and said deflecting member having a longitudinal portion extending from said end portion for holding the latching members in said position on said one side of the brushes while the contacts are being cleaned by said brushes.

2. In a machine for cleaning contacts of a relay having a movable armature yieldably held in a normal position against an abutment member on the relay and having a pair of horizontal oppositely directed mounting lugs on the ends thereof, the combination of a tank for holding a cleaning liquid, a conveyor movable across the tank, a track mounted in said tank for guiding said conveyor through a horizontal path, a plurality of cams mounted on said track within said tank in longitudinally spaced relation to each other, a plate on said conveyor disposed vertically and longitudinally thereof, a pair of arms extending horizontally and transversely from said plate and having horizontal surfaces engageable with the mounting lugs of the relay for supporting the relay at a predetermined elevation with the armature directed downwardly below said arms into the cleaning liquid in a position to be engaged by said cams and with the abutment member against said plate, said arms having hooked-shaped ends in spaced relation to the plate and provided with recesses and surfaces for receiving portions of the mounting lugs to support the relay against upward movement relative to said arms and against lateral movement away from said plate, a pair of flat springs on the plate engageable with the relay above said arms for urging the relay away from the plate and yieldably maintaining the mounting lugs in said recesses and in engagement with said hooked ends of said arms, and a pair of members extending laterally from said plate for receiving the relay therebetween to prevent movement of the relay longitudinally of said conveyor, the arrangement of said conveyor and said cams being such that the relay is carried by the conveyor through a predetermined path to cause the armatures to engage said cams and be actuated thereby at intervals to allow the cleaning fluid to flow between the armature and the abutment.

References Cited in the file of this patent

UNITED STATES PATENTS

| | | |
|---|---|---|
| 1,249,286 | Stone | Dec. 4, 1917 |
| 1,555,468 | Hall | Sept. 29, 1925 |
| 1,710,357 | Grunwald | Apr. 23, 1929 |
| 1,852,405 | Farley | Apr. 5, 1932 |
| 2,367,652 | Trier | Jan. 16, 1945 |
| 2,645,797 | Kraay | July 21, 1953 |